United States Patent
Mori et al.

(10) Patent No.: US 8,291,890 B2
(45) Date of Patent: Oct. 23, 2012

(54) INTERNAL COMBUSTION ENGINE OUTPUT CONTROL METHOD AND SYSTEM

(75) Inventors: Osamu Mori, Saitama (JP); Takeshi Asami, Saitama (JP)

(73) Assignee: Bosch Corporation, Tokyo (JP)

( * ) Notice: Subject to any disclaimer, the term of this patent is extended or adjusted under 35 U.S.C. 154(b) by 248 days.

(21) Appl. No.: 12/597,517

(22) PCT Filed: Apr. 23, 2008

(86) PCT No.: PCT/JP2008/057823
§ 371 (c)(1),
(2), (4) Date: Feb. 17, 2010

(87) PCT Pub. No.: WO2008/133264
PCT Pub. Date: Nov. 6, 2008

(65) Prior Publication Data
US 2010/0139623 A1    Jun. 10, 2010

(30) Foreign Application Priority Data
Apr. 25, 2007    (JP) ................................ 2007-115628

(51) Int. Cl.
*F02M 51/00*    (2006.01)
*B60W 10/04*    (2006.01)
*B60W 10/10*    (2012.01)
(52) U.S. Cl. ........................................ 123/493; 477/107
(58) Field of Classification Search .................. 123/350, 123/352, 357, 478, 480; 701/104, 105, 110, 701/113; 477/107, 108, 111
See application file for complete search history.

(56) References Cited

U.S. PATENT DOCUMENTS

| 4,714,144 | A | * | 12/1987 | Speranza | ........................ 477/84 |
| 4,766,544 | A | * | 8/1988 | Kurihara et al. | ................ 701/67 |
| 4,873,637 | A | * | 10/1989 | Braun | ............................. 701/67 |

(Continued)

FOREIGN PATENT DOCUMENTS

| JP | 2001234776 A | 8/2001 |
| JP | 2001328466 A | 11/2001 |
| JP | 2004270547 A | 9/2004 |

OTHER PUBLICATIONS

Microfilm of the specification and drawings annexed to the request of Japanese Utility Model Application No. 95749/1989 (Laid-open No. 35241/1991), Mazda Motor Corp., Apr. 5, 1991.

*Primary Examiner* — Stephen K Cronin
*Assistant Examiner* — Sherman Manley
(74) *Attorney, Agent, or Firm* — Michael Best & Friedrich LLP (57) ABSTRACT

The invention is directed to the improvement of starting performance in an engine rotational speed region that exceeds an idle rotation region without affecting normal traveling performance. At the time when a vehicle starts moving, when in an electronic control unit, the rotational speed of an engine is in a predetermined range that exceeds an idle rotation region and the engine rotational speed decreases, the electronic control unit adds a corrected fuel injection amount corresponding to the rate of decrease to a target fuel injection amount to create a new target fuel injection amount. When the rotational speed of the engine increases, the electronic control unit subtracts a corrected fuel injection amount corresponding to the rate of increase of the engine rotational speed from a target fuel injection amount to create a new target fuel injection amount. Control of the output of the engine is performed by the electronic control unit.

5 Claims, 5 Drawing Sheets

U.S. PATENT DOCUMENTS

| | | | | |
|---|---|---|---|---|
| 5,184,301 A | * | 2/1993 | Stasell | 701/110 |
| 5,316,116 A | * | 5/1994 | Slicker et al. | 477/181 |
| 5,529,548 A | * | 6/1996 | Mack | 477/84 |
| 5,980,428 A | * | 11/1999 | Liu | 477/180 |
| 6,126,569 A | * | 10/2000 | Genise | 477/91 |
| 6,254,509 B1 | * | 7/2001 | Meyer | 477/109 |
| 2001/0041644 A1 | | 11/2001 | Yasuoka et al. | |
| 2010/0280738 A1 | * | 11/2010 | Whitney et al. | 701/102 |

* cited by examiner

INTERNAL COMBUSTION ENGINE OUTPUT CONTROL METHOD AND SYSTEM

CROSS-REFERENCE TO RELATED APPLICATION

This application is a 35 U.S.C. 371 application of PCT/JP 2008/057823 filed on Apr. 23, 2008.

BACKGROUND OF THE INVENTION

1. Field of the Invention

The present invention relates to an internal combustion engine output control method and particularly to the improvement of the starting performance of a vehicle and the like.

2. Description of the Related Art

Conventionally, as this type of system, various systems have been proposed which, in order to raise the starting performance of a vehicle when an engine rotational speed is in the vicinity of an idle rotational speed, for example, perform correction that increases a target fuel injection amount in accordance with the extent of a drop of the actual engine rotational speed with respect to a target rotational speed when the vehicle starts moving and suppress a drop of the engine rotational speed at the time when the vehicle starts moving to prevent the occurrence of an engine stall as disclosed, for example, in JP-A-2004-270547.

However, correction of the target fuel injection amount in the aforementioned conventional systems has been limited to when the engine rotational speed is in the idle rotational speed region or at best when the engine rotational speed is in the vicinity of the idle rotational speed region.

As for this, when the applied range of that control is carelessly widened as far as a normal traveling region outside of the idle rotation region, the change in the engine rotational speed with respect to a through fuel injection amount during normal traveling becomes acute, conversely a phenomenon called a shock surge that causes fluctuation of the rotational speed when the vehicle starts moving occurs, and a problem arises in that this leads to a deterioration in the driving feeling.

Incidentally, in the actuality of vehicle operation, there are also instances where starting is performed at an engine rotational speed that exceeds the idle rotation region, and in these instances also, ensuring smooth starting without affecting traveling characteristics during normal travel is desired.

SUMMARY OF THE INVENTION

The present invention has been made in view of these circumstances and provides an internal combustion engine output control method and system that enable the improvement of starting performance in an engine rotational speed region that exceeds an idle rotation region without affecting normal traveling performance.

According to a first aspect of the present invention, there is provided an internal combustion engine output control method in an internal combustion engine output control system that is installed in a vehicle configured such that the rotational output of an internal combustion engine is transmitted to a transmission via a clutch and which enables control of the output of the internal combustion engine by controlling fuel injection to the internal combustion engine corresponding to a driving condition, the method comprising: at the time when the vehicle starts moving, when the rotational speed of the internal combustion engine is in a predetermined range that exceeds an idle rotation region and the rotational speed of the internal combustion engine decreases, adding a corrected fuel injection amount corresponding to the rate of decrease of the rotational speed of the internal combustion engine to a target fuel injection amount to create a new target fuel injection amount, and when the rotational speed of the internal combustion engine increases, subtracting a corrected fuel injection amount corresponding to the rate of increase of the rotational speed of the internal combustion engine from a target fuel injection amount to create a new target fuel injection amount, to thereby enable control of the output of the internal combustion engine.

According to a second aspect of the present invention, there is provided an internal combustion engine output control system that is installed in a vehicle configured such that the rotational output of an internal combustion engine is transmitted to a transmission via a clutch, is disposed with a fuel injection system that performs fuel injection to the internal combustion engine and an electronic control unit that controls fuel injection to the internal combustion engine by the fuel injection system in accordance with a driving condition of the vehicle, and which enables control of the output of the internal combustion engine, wherein the electronic control unit is configured such that, at the time when the vehicle starts moving, when the rotational speed of the internal combustion engine is in a predetermined range that exceeds an idle rotation region and the rotational speed of the internal combustion engine decreases, the electronic control unit adds a corrected fuel injection amount corresponding to the rate of decrease of the rotational speed of the internal combustion engine to a target fuel injection amount that is to be injected to the internal combustion engine by the fuel injection system to create a new target fuel injection amount, and when the rotational speed of the internal combustion engine increases, the electronic control unit subtracts a corrected fuel injection amount corresponding to the rate of increase of the rotational speed of the internal combustion engine from a target fuel injection amount that is to be injected to the internal combustion engine by the fuel injection system to create a new target fuel injection amount.

DETAILED DESCRIPTION OF THE PREFERRED EMBODIMENTS

Below, an embodiment of the present invention will be described with reference to FIG. 1 to FIG. 5.

It will be noted that the members and arrangements described below are not intended to limit the present invention and can be variously modified within the scope of the gist of the present invention.

First, a configural example of an internal combustion engine output control system of the embodiment of the present invention will be described with reference to FIG. 1.

This internal combustion engine output control system is, for example, realized in a four-wheel vehicle or the like that uses a diesel engine (below, called an "engine") 1 and is configured using an electronic control unit (in FIG. 1, notated as "ECU") 2 and a fuel injection system 3 as main configural elements.

The electronic control unit 2 performs control of fuel injection operation to the engine 1 by the fuel injection system 3 and performs various control processing necessary for operation of the vehicle.

This electronic control unit 2 is, for example, disposed with a microcomputer (not shown) that has a publicly known/commonly known configuration and storage elements (not shown) such as a RAM and a ROM and is configured using an input interface circuit (not shown) and an output interface circuit (not shown) as main configural elements.

Additionally, an output signal of an accelerator opening sensor 11 that detects an accelerator opening that is necessary in order to execute later-described internal combustion engine output control processing and output signals of a rotation sensor 12 that detects an engine rotational speed and a vehicle velocity sensor 13 that detects a vehicle velocity of the vehicle are inputted to the electronic control unit 2.

Further, the rotation of the engine 1 is transmitted to a transmission 5 via a manual clutch device 4, and unillustrated wheels are driven to rotate in accordance with an appropriate gear selection, but a gear position sensor (not shown) that detects the gear position of a transmission gear (not shown) is disposed inside the transmission 5, and an output signal SIGgear thereof is inputted to the electronic control unit 2.

The fuel injection system 3 is, for example, represented by a common rail fuel injection system or the like. This fuel injection system 3 injects and supplies fuel to the insides of cylinders of the engine 1 via fuel injection valves 6 at a target injection amount that has been determined by control from the electronic control unit 2.

Figure 1:
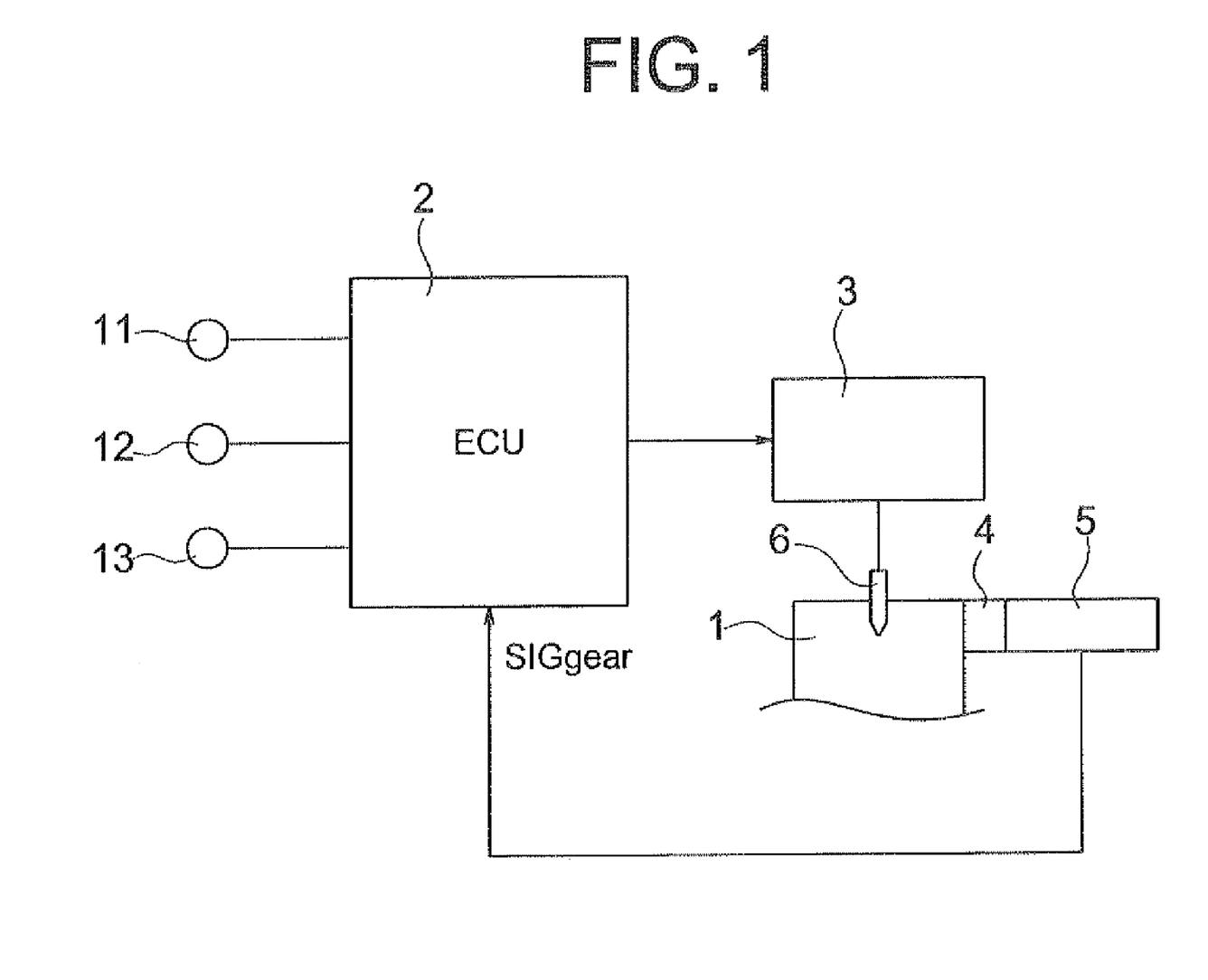
FIG. 1 is a configural diagram showing a configural example of an internal combustion engine output control system of an embodiment of the present invention.

It will be noted that, although the fuel injection valves 6 are ordinarily plurally disposed in accordance with the number of cylinders, in FIG. 1, the fuel injection valves are represented by one fuel injection valve 6 and shown.

Figure 2:
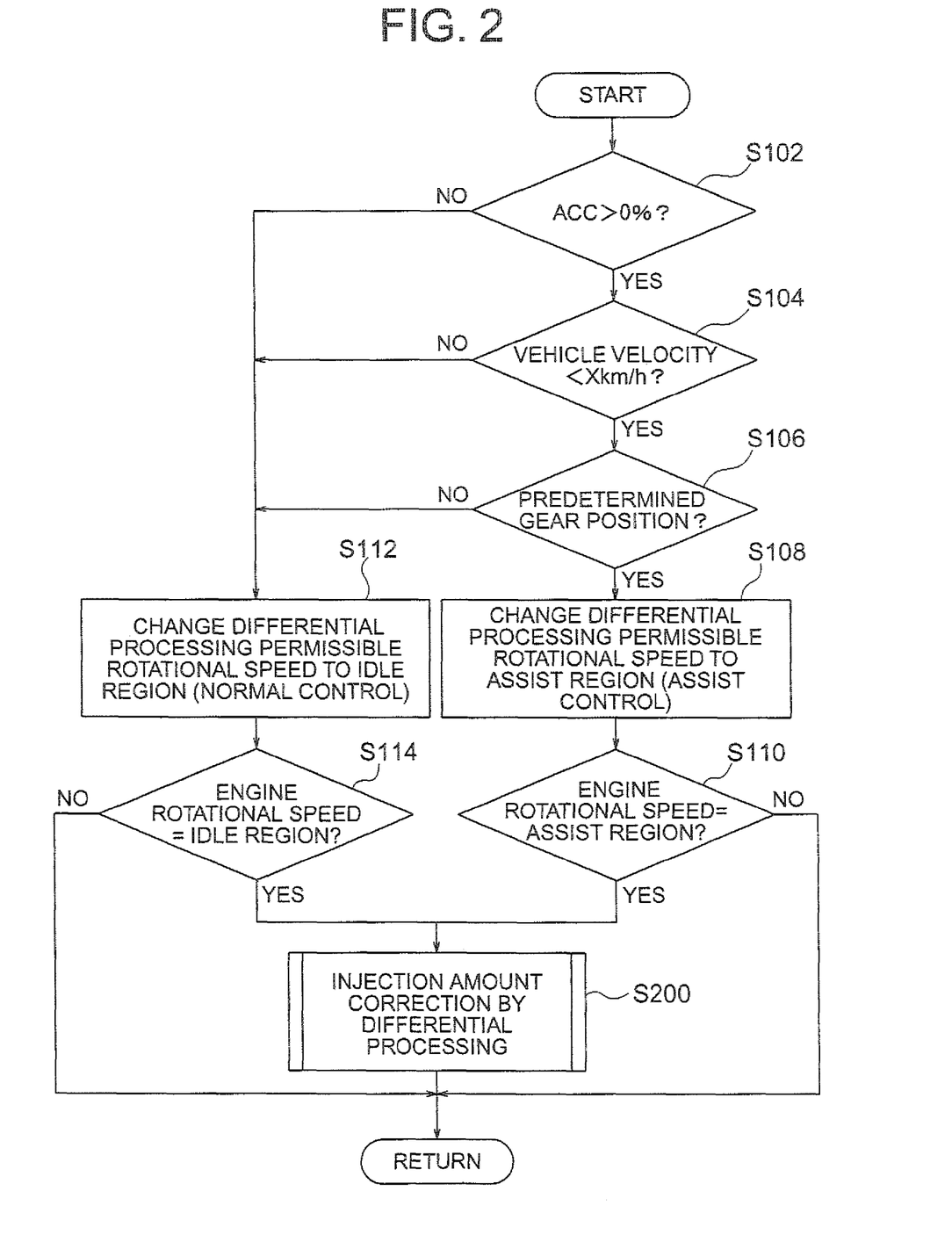
FIG. 2 is a sub-routine flowchart showing an entire procedure of internal combustion engine output control processing of the embodiment of the present invention.

In FIG. 2, there is shown a sub-routine flowchart showing a procedure of internal combustion engine output control processing that is executed in this system, and the content thereof will be described below with reference to the same figure.

When processing is started by the electronic control unit 2, first, it is determined whether an unillustrated accelerator has been stepped on based on an output signal ACC of the accelerator opening sensor 11, or in other words, whether or not the accelerator opening ACC is larger than 0% (ACC>0%) (see step S102 of FIG. 2).

Then, in step S102, when it is determined that the accelerator opening is larger than 0% (in the case of YES), the processing of next-described step S104 is executed by the electronic control unit 2, and when it is determined that the accelerator opening is not larger than 0% (in the case of NO), that is, in other words, when it is determined that stepping on the accelerator has not been performed, the processing of later-described step S112 is executed.

In step S104, it is determined whether or not the vehicle velocity that has been detected by the vehicle velocity sensor 13 is smaller than a predetermined vehicle velocity XKm/h.

Here, the predetermined velocity is set to a relatively small value because the internal combustion engine output control of the embodiment of the present invention is performed from the standpoint of ensuring a smooth driving feeling at the time when the vehicle starts moving, and it is preferred that the predetermined velocity is a vehicle velocity roughly in second gear or below. The extent of the value to which X is specifically set is not limited to a specific value, and it is preferable for X to be set in consideration of the scale and the like of the vehicle.

Then, in step S104, when it is determined that the vehicle velocity is smaller than the predetermined vehicle velocity XKm/h (in the case of YES), the sub-routine proceeds to the processing of next-described step S106, and when it is determined that the vehicle velocity is not smaller than the predetermined vehicle velocity XKm/h (in the case of NO), or in other words, when it is determined that the vehicle velocity exceeds the predetermined vehicle velocity XKm/h, the sub-routine proceeds to the processing of later-described step S112.

In step S104, it is determined on the basis of an output signal corresponding to the gear position from the transmission 5 whether or not the unillustrated transmission gear of the transmission 5 is in a predetermined position that has been determined beforehand to perform later-described assist control.

Then, in step S106, when it is determined that the transmission gear is in the predetermined gear position (in the case of YES), the sub-routine proceeds to the processing of later-described step S108, and when it is determined that the transmission gear is not in the predetermined gear position (in the case of NO), the sub-routine proceeds to the processing of later-described step S112.

It will be noted that the series of processing of the aforementioned steps S102, S104 and S106 is performed in order to confirm that the vehicle is placed in a state on the brink of starting by the volition of the driver.

In step S108, change to an assist region of a predetermined engine rotational speed (differential processing permissible rotational speed) that becomes a reference that determines whether or not to execute differential processing (described later) is performed.

That is, first, it is assumed that the internal combustion engine output control system of the embodiment of the present invention is configured such that, in order to improve starting performance in an idle region (idle rotation region), control that has conventionally been performed that corrects, in accordance with a change in the engine rotational speed, a target fuel injection amount that is determined with respect to the engine rotational speed at the time when the vehicle starts is performed in the idle region. It will be noted that this conventional correction of the target fuel injection amount corresponding to a change in the engine rotational speed in the idle region will be appropriately called "normal control" in the following description.

Additionally, in this normal control, the correction amount is determined in accordance with the size of the differential value of the engine rotational speed, and setting of the correction amount based on this differential value is called "differential processing".

Conventionally, this differential processing has been limited when the engine rotational speed is in a predetermined range, or specifically in the region of the idle rotational speed. In contrast, in the embodiment of the present invention, in addition to a predetermined engine rotational speed that becomes a starting reference of conventional differential processing, a reference separate from this is disposed. This new engine rotational speed reference for starting differential processing is determined from the standpoint of assisting starting in an engine rotational speed region that is higher than the idle rotational speed. Additionally, performing correction of the target fuel injection amount by differential processing based on this new reference is called "assist control".

By "changing the differential processing permissible rotational speed to an assist region" in step S108 is meant changing the engine rotational speed that becomes a reference for determining whether or not it is necessary to start differential processing in this manner to the aforementioned newly disposed reference for starting assist control separately from the conventional reference.

It will be noted that the differential processing permissible rotational speed may be set to one specific rotational speed or to a predetermined range.

Further, as for the extent to which the differential processing permissible rotational speed is specifically determined, it is preferable for the differential processing permissible rotational speed of the assist region to be set in consideration of the scale and the like of the vehicle and is not limited to a specific value.

After the processing of step S108 has been executed as mentioned above, it is determined whether or not the engine rotational speed is in the predetermined assist region (see step S110 of FIG. 2), and when it is determined that the engine rotational speed is in the assist region (in the case of YES), the sub-routine proceeds to the processing of later-described step S200, and when it is determined that the engine rotational speed is not in the assist region (in the case of NO), the series of processing is ended.

In step S112, the differential processing permissible rotational speed is set to a value of the idle rotational speed region in correspondence to various conditions for performing assist control not being established (see steps S102 to S106 of FIG. 2).

Next, the sub-routine moves to step S114, where it is determined whether or not the engine rotational speed is in the predetermined idle region (see step S114 of FIG. 2), and when it is determined that the engine rotational speed is in the idle region (in the case of YES), the sub-routine moves to the processing of later-described step S200, and when it is determined that the engine rotational speed is not in the idle region (in the case of NO), the series of processing is ended.

Then, in step S200, correction of the target fuel injection amount is performed by differential processing, fuel injection is performed such that injection by the fuel injection system 3 becomes a target fuel injection amount after correction, and the sub-routine returns to an unillustrated main routine.

Figure 3:
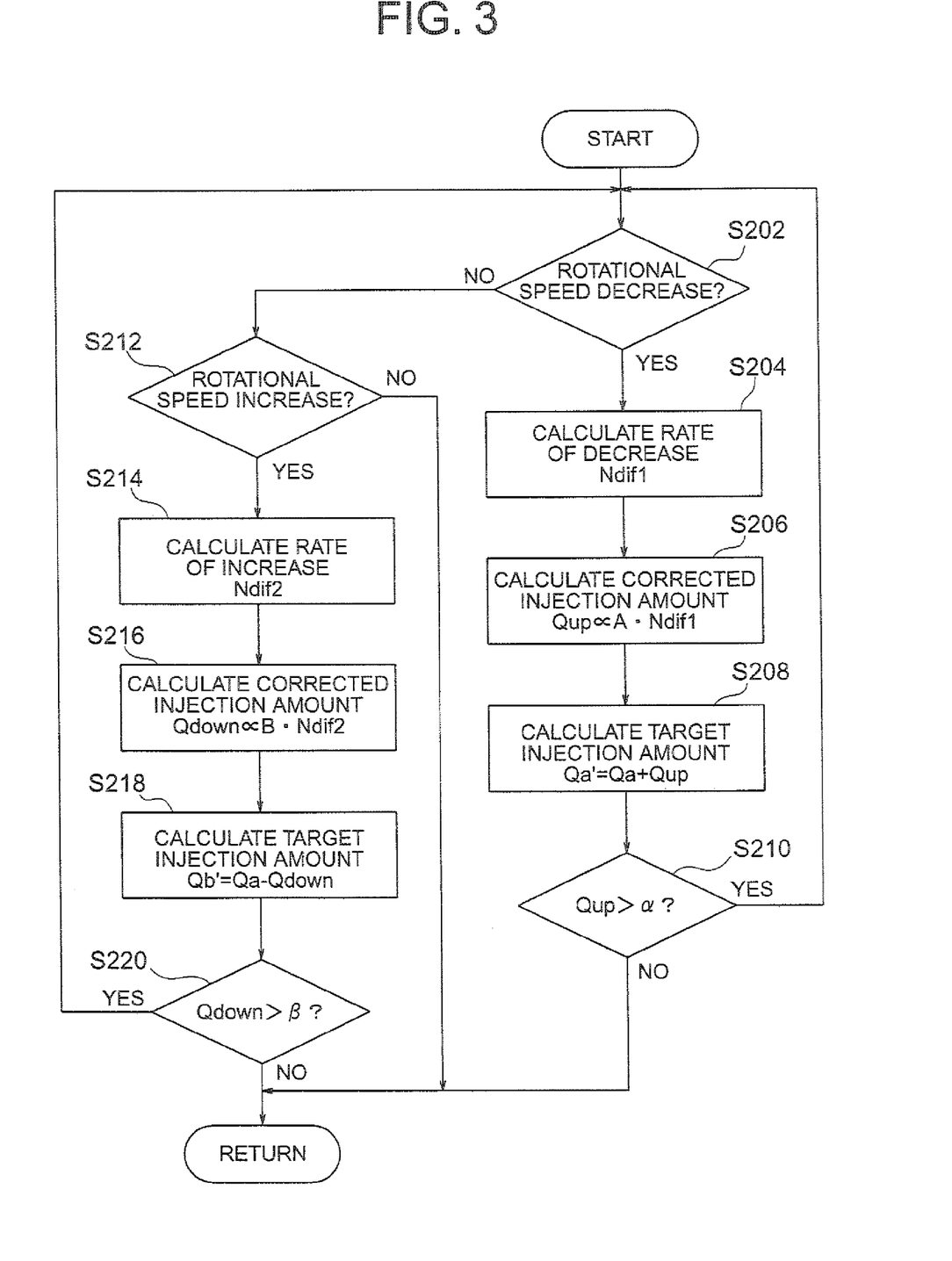
FIG. 3 is a sub-routine flowchart showing a more specific procedure of injection amount correction processing of FIG. 2.

In FIG. 3, a more specific processing procedure of the aforementioned injection amount correction (see step S200 of FIG. 2) by differential processing is shown in a sub-routine flowchart, and the content thereof will be described below with reference to the same figure.

When processing is started, first, it is determined whether or not a decrease has occurred in the engine rotational speed that has been detected by the rotation sensor 12 (see step S202 of FIG. 3).

It will be noted that it is possible to determine whether or not a decrease of the engine rotational speed has occurred by a size comparison or the like between the most recent detected value of the rotation sensor 12 that has been read into the electronic control unit 2 and the previous detected value before that.

Then, in step S202, when it is determined that there is a decrease of the engine rotational speed (in the case of YES), the sub-routine proceeds to the processing of next-described step S204, and when it is determined that there is no decrease of the engine rotational speed (in the case of NO), the sub-routine proceeds to the processing of later-described step S212.

In step S204, calculation of a rate of decrease Ndif1 of the engine rotational speed is performed. That is, in the embodiment of the present invention, the differential value of the engine rotational speed is used as the rate of decrease Ndif1. Here, assuming that n1 represents the engine rotational speed at a certain time and that n2 represents the engine rotational speed after the elapse of a minute amount of time $\Delta t$ (n2<n1), the differential value of the engine rotational speed at the time of the decrease of the engine rotational speed is determined as Ndif1=(n2−n1)/$\Delta t$, and the value thereof is a negative value because n2<n1.

Next, calculation of a corrected fuel injection amount is performed (see step S206 of FIG. 3). That is, in the embodiment of the present invention, a corrected fuel injection amount QuP is proportional to the size of the previous differential value Ndif1 and specifically is calculated as the product of a proportionality constant A and the differential value Ndif1.

Next, amount-of-increase correction of the target fuel injection amount is performed in correspondence to a decrease of the engine rotational speed arising (see step S208 of FIG. 3).

That is, the corrected fuel injection amount QuP that has been calculated in the previous step S206 is added to a target fuel injection amount Qa, and the addition result thereof is made into a new target fuel injection amount Qa'.

It will be noted that the target fuel injection amount Qa is calculated in fuel injection control processing that is executed in the unillustrated main routine and is calculated on the basis of the gear position and opening of the unillustrated accelerator and the like.

After correction of the target fuel injection amount has been performed as mentioned above, it is determined whether or not the previous corrected fuel injection amount QuP exceeds a predetermined first reference value α (see step S210 of FIG. 3), and when it is determined that the corrected fuel injection amount QuP exceeds the predetermined amount-of-increase correction reference value α (in the case of YES), it is determined that the rate of decrease of the engine rotational speed is still large and that amount-of-decrease correction of the target fuel injection amount is necessary, so the sub-routine returns to the previous step S202 and the series of processing is repeated.

On the other hand, in step S210, when it is determined that the corrected fuel injection amount QuP does not exceed the predetermined amount-of-increase correction reference value α (in the case of NO), it is determined that the rate of decrease in the engine rotational speed is in a state where correction of the target fuel injection amount is not required, so the series of processing is ended.

Next, in the previous step S202, when it is determined that there is no decrease of the engine rotational speed (in the case of NO), it is determined whether or not the engine rotational speed that has been detected by the rotation sensor 12 is increasing (see step S212 of FIG. 3).

Then, in step S212, when it is determined that the engine rotational speed is increasing (in the case of YES), the sub-routine proceeds to the processing of next-described step S214, and when it is determined that the engine rotational speed is not increasing (in the case of NO), it is determined that the target fuel injection amount is not necessary and the series of processing is ended.

In step S214, calculation of a rate of increase Ndif2 of the engine rotational speed is performed. That is, in the embodiment of the present invention, the differential value of the engine rotational speed is used as the rate of increase Ndif2. Here, assuming that n3 represents the engine rotational speed at a certain time and that n4 represents the engine rotational speed after the elapse of a minute amount of time $\Delta t$ (n4>n3), the differential value of the engine rotational speed at the time of the increase of the engine rotational speed is determined as Ndif2=(n4−n3)/$\Delta t$, and the value thereof is a positive value because n4>n3.

Next, calculation of a corrected fuel injection amount is performed (see step S216 of FIG. 3). That is, in the embodiment of the present invention, a corrected fuel injection amount Qdown is proportional to the size of the previous differential value Ndif2 and specifically is calculated as the product of a proportionality constant B and the differential value Ndif2.

Next, amount-of-decrease correction of the target fuel injection amount is performed in correspondence to the engine rotational speed increasing (see step S218 of FIG. 3).

That is, the corrected fuel injection amount Qdown that has been calculated in the previous step S216 is subtracted from the target fuel injection amount Qa at this point in time, and the subtraction result thereof is made into a new target fuel injection amount Qb'.

After correction of the target fuel injection amount has been performed as mentioned above, it is determined whether or not the previous corrected fuel injection amount Qdown exceeds a predetermined amount-of-decrease correction reference value β (see step S220 of FIG. 3), and when it is determined that the corrected fuel injection amount Qdown exceeds the predetermined amount-of-decrease correction reference value β (in the case of YES), it is determined that the rate of increase of the engine rotational speed is still large and that amount-of-decrease correction of the target fuel injection amount is necessary, so the sub-routine returns to the previous step S202 and the series of processing is repeated.

It will be noted that, in this processing example, the corrected fuel injection amount corresponding to the rate of decrease or the rate of increase of the engine rotational speed is added to or subtracted from the target fuel injection amount, whereby correction of the target fuel injection amount is performed, but the manner of correction is not limited to addition and subtraction of a certain correction amount in this manner.

For example, a correction coefficient may be determined in accordance with the rate of decrease or the rate of increase of the engine rotational speed, and this correction coefficient may be multiplied by the target fuel injection amount.

Next, overall operation of the vehicle resulting from execution of the aforementioned internal combustion engine output control processing will be described with reference to FIG. 4 and FIG. 5.

First, conventional vehicle operation at the time when the vehicle starts moving will be described with reference to FIG. 4. It will be noted that, in FIG. 4, the horizontal axis represents the engine rotational speed and the vertical axis represents the fuel injection amount.

Figure 4:
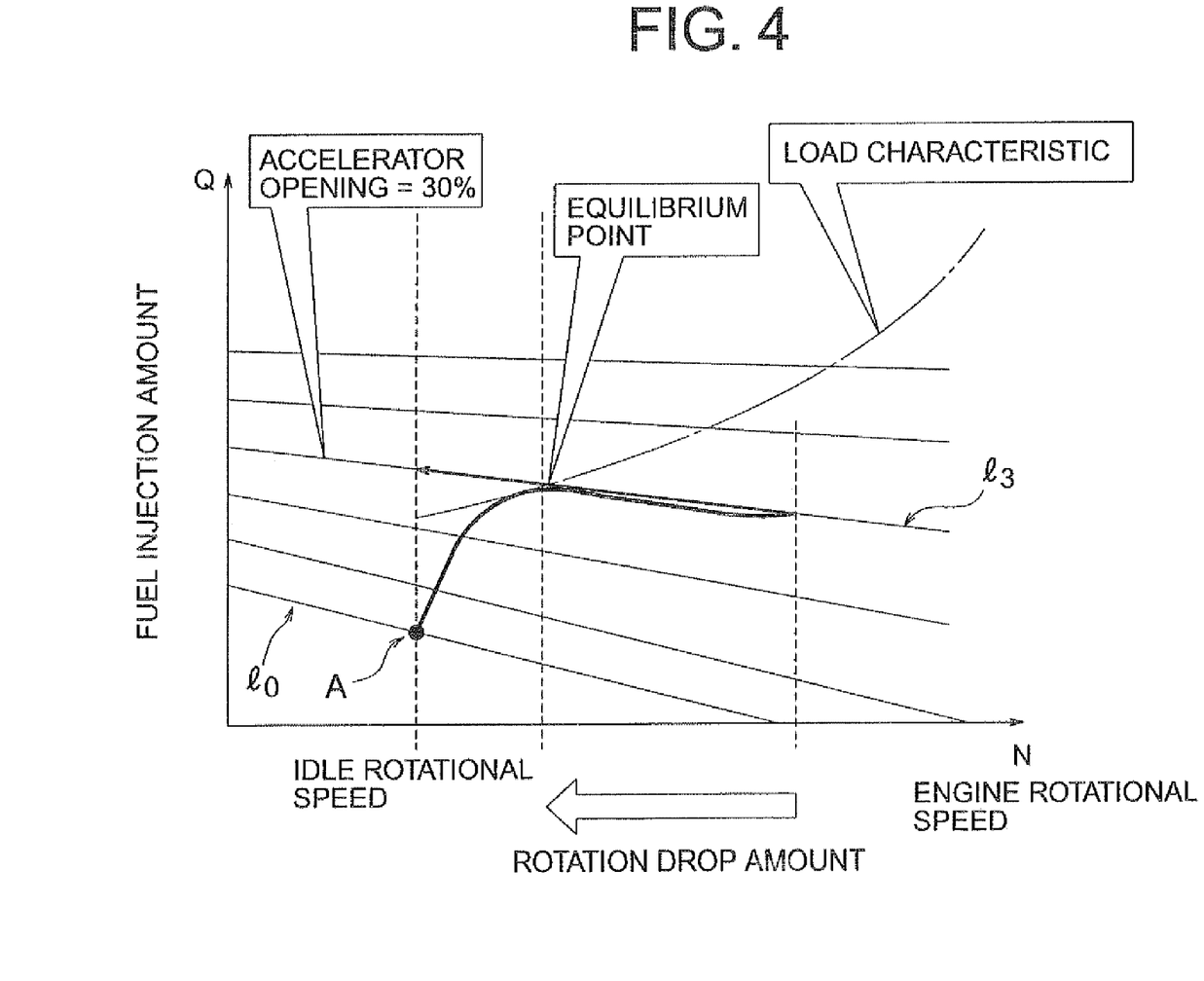
FIG. 4 is a characteristic line diagram showing, using an accelerator opening as a parameter, the relationship between an engine rotational speed and a fuel injection amount for describing engine operation during conventional travel.

First, it will be assumed that the vehicle is in a state where the clutch device 4 and the transmission 5 are not connected and in a state where the accelerator (not shown) is also not stepped on, an idle state, that is, where the engine rotational speed is in the idle rotational speed (point of reference sign A in FIG. 4). It will be noted that, in FIG. 4, the fine solid line (reference sign $l_0$) passing through reference sign A is a characteristic line (below, called an "opening characteristic line") that represents the relationship between the engine rotational speed and the fuel injection amount when the accelerator opening is 0%.

Next, when the accelerator (not shown) is stepped on in this state such that the opening is made into 30%, for example, the engine rotational speed moves on an opening characteristic line $l_3$ where there is the notation of accelerator opening 30% from the point represented by reference sign A, but because the clutch device 4 is still not yet connected, the engine rotational speed rises along the line of this opening characteristic line $l_3$.

Then, after this, a load is applied to the engine 1 as a result of the clutch device 4 being connected, so the engine rotational speed decreases along the opening characteristic line $l_3$, but the target fuel injection amount is increased in correspondence to the decrease of the engine rotational speed because of fuel injection control in the electronic control unit 2, so the engine rotational speed gradually recovers (increases) along the opening characteristic line $l_3$. Then, eventually, the point of intersection between the engine load characteristic indicated by the one-dotted chain line and the opening characteristic line $l_3$ becomes an equilibrium point, but when the engine rotational speed rises toward this equilibrium point, it first passes through this equilibrium point because of the inertia of the load torque, thereafter the engine rotational speed gradually drops toward a rotational speed at the equilibrium point and converges with the equilibrium point. It will be noted that, as in the case of this example, when the accelerator (not shown) is stepped on and the engine rotational speed exceeds the idle rotational speed region in an idling state, normal control of differential processing (see steps S112 and S114 of FIG. 2) is not performed and is avoided.

In this conventional control, fluctuation of the engine rotational speed immediately after the clutch device 4 is connected is relatively large and deteriorates the driving feeling.

On the other hand, when the internal combustion engine output control processing of the embodiment of the present invention that has been described previously is executed, vehicle operation at the time when the vehicle starts moving as mentioned above becomes as described next.

Vehicle operation at the time when the vehicle starts moving when the internal combustion engine output control processing of the embodiment of the present invention will be described with reference to FIG. 5.

Figure 5:
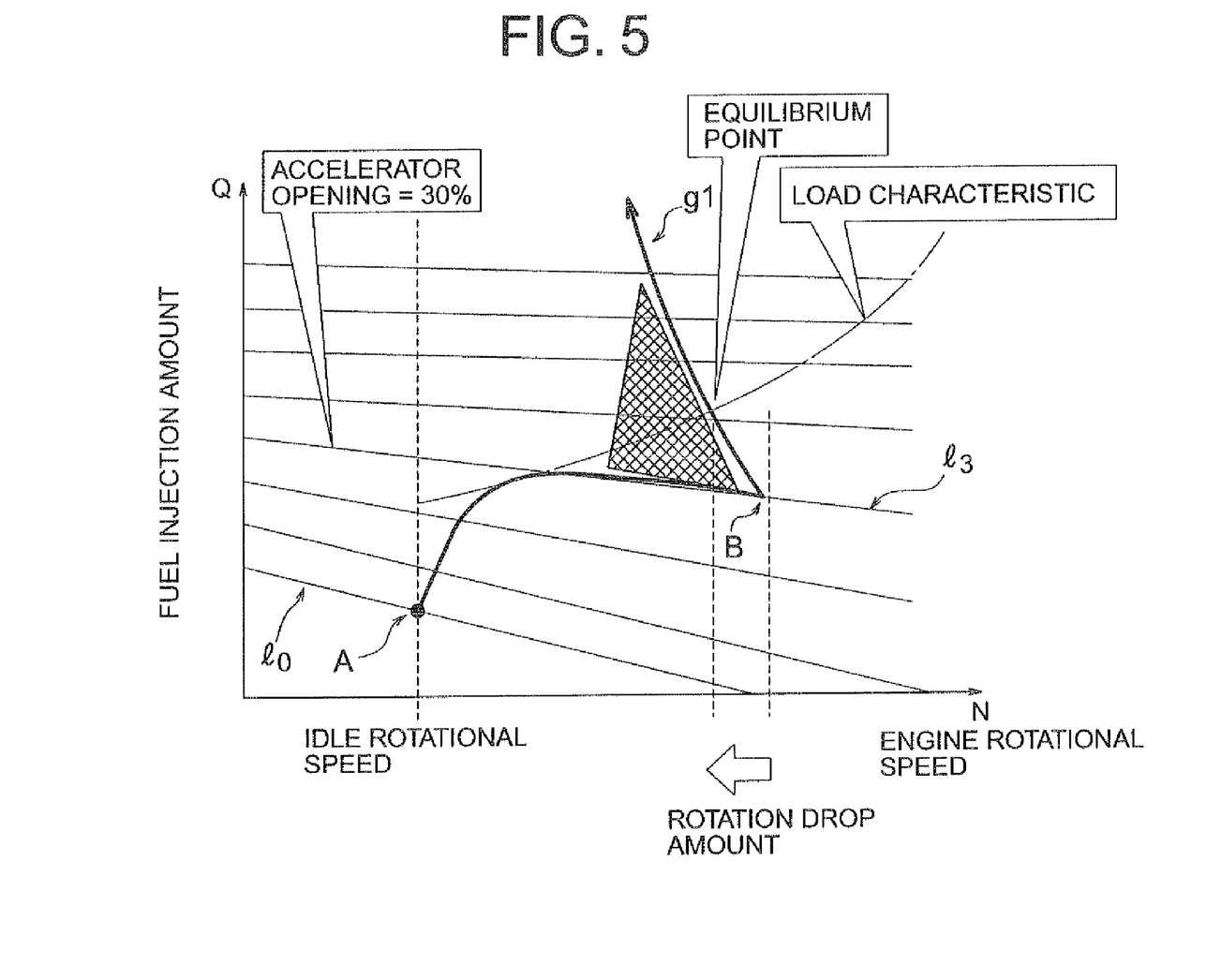
FIG. 5 is a characteristic line diagram showing, using an accelerator opening as a parameter, the relationship between an engine rotational speed and a fuel injection amount for describing engine operation when the internal combustion engine output control processing of the embodiment of the present invention is executed.

FIG. 5 is a diagram where a characteristic line (reference sign g1) that represents a change characteristic example of the corrected fuel injection amount in the internal combustion engine output control processing of the embodiment of the present invention and a general sum amount (hatched portion) of the corrected fuel injection amount at the time of a decrease of the engine rotational speed are superposed on the characteristic line diagram shown in FIG. 4, and excluding this point, FIG. 5 is basically the same as FIG. 4.

Consequently, detailed description in regard to points and characteristic lines to which reference signs that are the same as those in FIG. 4 have been added will be omitted.

First, it will be assumed that the vehicle is in a state where the clutch device 4 is not connected and in a state where the accelerator (not shown) is also not stepped on, an idling state, that is, where the engine rotational speed is in the idle rotational speed (point of reference sign A in FIG. 5). Then, when the accelerator (not shown) is stepped on in this state such that the opening thereof is made into 30%, for example, the point where the engine rotational speed moves on the opening characteristic line $l_3$ is the same as in the case of the conventional vehicle operation that has been previously described.

Then, assuming that the clutch device 4 is not connected at this point in time, the engine rotational speed rises along the line of this opening characteristic line $l_3$, which is the same as has conventionally been the case.

Thereafter, a load is applied to the engine 1 as a result of the clutch device 4 being connected, so the engine rotational speed first tries to decrease along the opening characteristic line $l_3$ toward the equilibrium point that is the point of intersection with the load curve (see the one-dotted chain line characteristic line of FIG. 5), but as mentioned next, in contrast to what has conventionally been the case, assist control is performed.

That is, in the embodiment of the present invention, when, at the time of this decrease of the engine rotational speed, it is determined that the vehicle velocity is smaller than the predetermined vehicle velocity XKm/h and that the gear position of the transmission 5 is a predetermined position, it is determined that starting assist is necessary, and the differential processing permissible rotational speed that determines whether or not to execute differential processing is changed from the value at the time of normal control to a value of the assist region (see steps S104 to S108 of FIG. 2).

Then, when the engine rotational speed exceeds the differential processing permissible rotational speed of that assist region, correction of the target fuel injection amount Qa by differential processing is performed (see step S200 of FIG. 2).

That is, while the corrected fuel injection amount Qup is exceeding the predetermined first reference value α, the corrected fuel injection amount Qup that is determined in accordance with the rate of decrease Ndif1 of the engine rotational speed from the target fuel injection amount Qa is added, the addition result thereof is made into the new target fuel injection amount Qa', and fuel injection is performed (steps S202 to S210 of FIG. 3).

As a result, the engine rotational speed increases toward the equilibrium point between the engine torque and the load characteristic that occurs in accordance with that new target fuel injection amount Qa'.

In FIG. 5, the relationship between the change of the corrected fuel injection amount and the decrease of the engine rotational speed in this case is generally shown.

That is, in FIG. 5, assuming that the point of reference sign B is a point where differential processing has been started, the curve to which reference sign g1 has been added is a characteristic line representing a general change example of the corrected fuel injection amount Qup when the engine rotational speed decreases on the opening characteristic line $l_3$, and indicates that the corrected fuel injection amount Qup increases in accompaniment with the decrease of the engine rotational speed (direction of the white arrow in FIG. 5).

The addition of the corrected fuel injection amount Qup to the target fuel injection amount Qa is equivalent to the accelerator (not shown) being stepped on further and the accelerator opening increasing; therefore, the engine rotational speed converges using, as the equilibrium point, the point of intersection between the load curve and the opening characteristic line of the accelerator that corresponds to when the new target fuel injection amount Qa' after correction is made into the normal target fuel injection amount Qa.

Yet, in a case where the inertia of the load torque of the engine 1 is large or the like, the engine rotational speed further increases through the aforementioned equilibrium point, but in that case, conversely from the previous case of a decrease of the engine rotational speed, until the corrected fuel injection amount Qdown that is determined in accordance with the rate of increase Ndif2 of the engine rotational speed falls below the predetermined amount-of-decrease correction reference value β, fuel injection is performed with the subtraction result that has been obtained as a result of the corrected fuel injection amount Qdown being subtracted from the target fuel injection amount Qa at that time being used as the new target fuel injection amount Qa', and the engine rotational speed drops (see steps S212 to S220 of FIG. 3).

In this manner, under a constant condition, in contrast to what has conventionally been the case, in a region of the engine rotational speed that is higher than the idle rotation region, the target fuel injection amount Qa is corrected with respect to an increase or a decrease of the engine rotational speed and in accordance with that rate of increase or rate of decrease, and the increase of the engine rotational speed is suppressed or the decrease of the engine rotational speed is suppressed, so even when fluctuation of the load torque resulting from the starting of the vehicle arises, smooth starting is performed without leading to sudden fluctuation of the engine rotational speed.

It will be noted that, in FIG. 5, the hatched triangular portion generally represents the entire amount of the corrected fuel injection amount in a case where the opening characteristic line $l_3$ serves as a transverse axis that represents the amount-of-decrease (rotation drop amount) of the engine rotational speed and where the change of the corrected fuel injection amount is represented by characteristic line g1.

In this case, the amount-of-decrease of the engine rotational speed becomes large in the vertical axis direction that represents the fuel injection amount, or in other words, in the direction where the engine rotational speed becomes smaller.

It will be noted that, in the preceding embodiment, a configural example using the diesel engine 1 has been described, but it is not necessary for the engine to be limited to the diesel engine 1 and may of course be another form of engine.

As described above, the internal combustion engine output control method pertaining to the present invention is suited for engine output control of a vehicle where further improvement of the driving feeling and accurate fuel injection are desired.

According to the present invention, the invention achieves the effect that the invention can reliably improve starting performance in the rotational speed region of the internal combustion engine that exceeds the idle rotation region without affecting normal traveling performance.

In particular, the invention is configured to perform correction of an amount corresponding to the size of the rate of decrease or the rate of increase of the rotational speed of the internal combustion engine, so the invention can realize is starting with little feeling of discomfort.

Further, the invention achieves the effect that, when the correction amount that is determined in accordance with the size of the rate of decrease or the rate of increase of the rotational speed of the internal combustion engine with respect to the target fuel injection amount, the invention can avoid correction beyond what is necessary and prevent needless fuel injection by stopping correction,

What is claimed is:

1. An internal combustion engine output control method in an internal combustion engine output control system that is installed in a vehicle configured such that the rotational output of an internal combustion engine is transmitted to a transmission via a clutch and which enables control of the output of the internal combustion engine by controlling fuel injection to the internal combustion engine corresponding to a driving condition, the method comprising:

at the time when the vehicle starts moving, when the rotational speed of the internal combustion engine is in a predetermined range that exceeds an idle rotation region and the rotational speed of the internal combustion engine decreases, adding a corrected fuel injection amount corresponding to the rate of decrease of the rotational speed of the internal combustion engine to a target fuel injection amount that is determined with respect to the engine rotational speed at the time when the vehicle starts is performed to create a new target fuel injection amount, and when the rotational speed of the internal combustion engine increases, subtracting a corrected fuel injection amount corresponding to the rate of increase of the rotational speed of the internal combustion engine from a target fuel injection amount that is determined with respect to the engine rotational speed at the time when the vehicle starts is performed to create a new target fuel injection amount, to thereby enable control of the output of the internal combustion engine.

2. The internal combustion engine output control method according to claim 1, wherein when the corrected fuel injection amount corresponding to the rate of decrease falls below a predetermined amount-of-increase correction reference value, addition of the corrected fuel injection amount to the target fuel injection amount is stopped, and when the corrected fuel injection amount corresponding to the rate of increase falls below a predetermined amount-of-decrease correction reference value, subtraction of the corrected fuel injection amount from the target fuel injection amount is stopped.

3. An internal combustion engine output control system that is installed in a vehicle configured such that the rotational output of an internal combustion engine is transmitted to a transmission via a clutch, is disposed with a fuel injection system that performs fuel injection to the internal combustion engine and an electronic control unit that controls fuel injection to the internal combustion engine by the fuel injection system in accordance with a driving condition of the vehicle, and which enables control of the output of the internal combustion engine, wherein the electronic control unit is configured such that, at the time when the vehicle starts moving, when the rotational speed of the internal combustion engine is in a predetermined range that exceeds an idle rotation region and the rotational speed of the internal combustion engine decreases, the electronic control unit adds a corrected fuel injection amount corresponding to the rate of decrease of the rotational speed of the internal combustion engine to a target fuel injection amount that is determined with respect to the engine rotational speed at the time when the vehicle starts is performed that is to be injected to the internal combustion engine by the fuel injection system to create a new target fuel injection amount, and when the rotational speed of the internal combustion engine increases, the electronic control unit subtracts a corrected fuel injection amount corresponding to the rate of increase of the rotational speed of the internal combustion engine from a target fuel injection amount that is determined with respect to the engine rotational speed at the time when the vehicle starts is performed that is to be injected to the internal combustion engine by the fuel injection system to create a new target fuel injection amount.

4. The internal combustion engine output control system according to claim 3, wherein the electronic control unit is configured such that when the corrected fuel injection amount corresponding to the rate of decrease falls below a predetermined amount-of-increase correction reference value, the electronic control unit stops addition of the corrected fuel injection amount to the target fuel injection amount, and when the corrected fuel injection amount corresponding to the rate of increase falls below a predetermined amount-of-decrease correction reference value, the electronic control unit stops subtraction of the corrected fuel injection amount from the target fuel injection amount.

5. An internal combustion engine output control program that is executed by an electronic control unit in an internal combustion engine output control system that is installed in a vehicle configured such that the rotational output of an internal combustion engine is transmitted to a transmission via a clutch, is disposed with a fuel injection system that performs fuel injection to the internal combustion engine and the electronic control unit that controls fuel injection to the internal combustion engine by the fuel injection system in accordance with a driving condition of the vehicle, and which enables control of the output of the internal combustion engine, the program comprising the steps of at the time when the vehicle starts moving, determining whether or not the rotational speed of the internal combustion engine is in a predetermined range that exceeds an idle rotation region;

at the time when the vehicle starts moving, determining whether or not the rotational speed of the internal combustion engine has decreased when it has been determined that the rotational speed of the internal combustion engine is in the predetermined range that exceeds the idle rotation region;

calculating the rate of decrease of the rotational speed of the internal combustion engine when it has been determined that the rotational speed of the internal combustion engine has decreased;

calculating a corrected fuel injection amount corresponding to the rate of decrease that has been calculated and adding the corrected fuel injection amount that has been calculated to a target fuel injection amount that is determined with respect to the engine rotational speed at the time when the vehicle starts is performed;

in the step of determining whether or not the rotational speed of the internal combustion engine has decreased, determining whether or not the rotational speed of the internal combustion engine has increased when it has been determined that the rotational speed of the internal combustion engine has not decreased;

calculating the rate of increase of the rotational speed of the internal combustion engine when it has been determined that the rotational speed of the internal combustion engine has increased;

calculating a corrected fuel injection amount corresponding to the rate of increase that has been calculated and subtracting the corrected fuel injection amount that has been calculated from a target fuel injection amount that is determined with respect to the engine rotational speed at the time when the vehicle starts is performed;

determining whether or not the corrected fuel injection amount that has been calculated in accordance with the rate of decrease of the rotational speed of the internal combustion engine exceeds a predetermined amount-of-increase correction reference value and, when it has been determined that the corrected fuel injection amount exceeds the predetermined amount-of-increase correction reference value, continuously executing a series of processing, and when it has been determined that the corrected fuel injection amount falls below the predetermined amount-of-increase correction reference value, stopping a series of processing;

determining whether or not the corrected fuel injection amount that has been calculated in accordance with the rate of increase of the rotational speed of the internal combustion engine exceeds a predetermined amount-of-decrease correction reference value and, when it has been determined that the corrected fuel injection amount exceeds the predetermined amount-of-decrease correction reference value, continuously executing a series of processing, and when it has been determined that the corrected fuel injection amount falls below the predetermined amount-of-decrease correction reference value, stopping a series of processing.

* * * * *